United States Patent [19]

Hostetler

[11] 4,003,339
[45] Jan. 18, 1977

[54] METHOD AND APPARATUS FOR DELIVERING LARGE QUANTITIES OF FEED AND THE LIKE

[75] Inventor: Eldon Hostetler, Middlebury, Ind.

[73] Assignee: Chore-Time Equipment, Inc., Milford, Ind.

[22] Filed: Nov. 6, 1972

[21] Appl. No.: 303,977

[52] U.S. Cl. .......................................... 119/52 AF
[51] Int. Cl.² ...................................... A01K 5/02
[58] Field of Search .............. 119/52 AF, 51.11, 53

[56] References Cited

UNITED STATES PATENTS

| | | | |
|---|---|---|---|
| 3,033,163 | 5/1962 | Hostetler et al. | 119/52 AF |
| 3,134,478 | 5/1964 | Haen et al. | 119/52 AF X |
| 3,415,228 | 12/1968 | Myers | 119/52 AF UX |
| 3,598,087 | 8/1971 | Ramser | 119/51.11 |

*Primary Examiner*—Hugh R. Chamblee
*Attorney, Agent, or Firm*—Olson, Trexler, Wolters, Bushnell & Fosse, Ltd.

[57] ABSTRACT

A high capacity conveyor for delivering relatively large quantities of poultry feed and the like is disclosed, and a method of operating the conveyor is described. A centerless auger having flights of full radial extent is rapidly rotated to move mixed feed particles down a tube. A rolling action is thus imparted to at least some of the feed particles, thereby reducing the power required to drive the auger. Outlet holes are formed in the tube to dispense the feed to the associated flock feeding station; the holes are formed at least in part in the shape of a V-notch, having one edge oriented substantially parallel to the flight of the auger, so that a slice of feed containing the proper proportion of each feed mix component is dispensed with each rotation of the auger.

2 Claims, 8 Drawing Figures

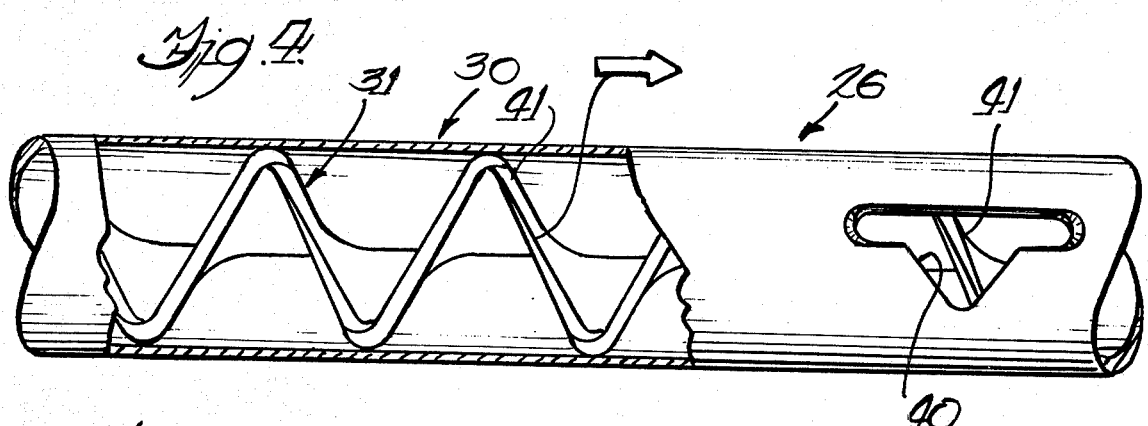
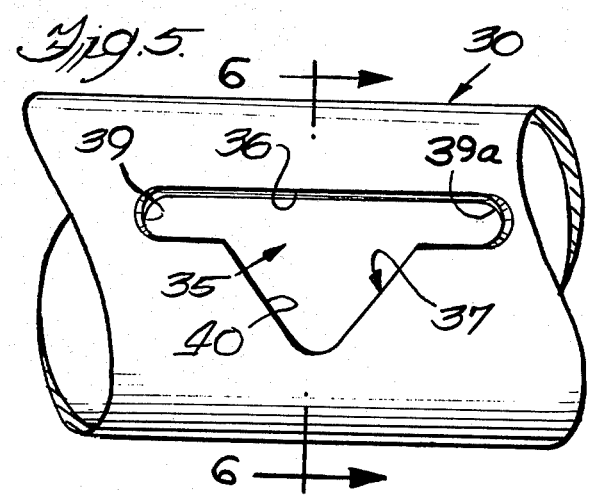
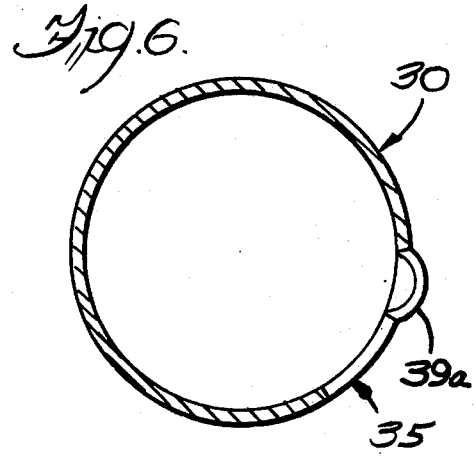
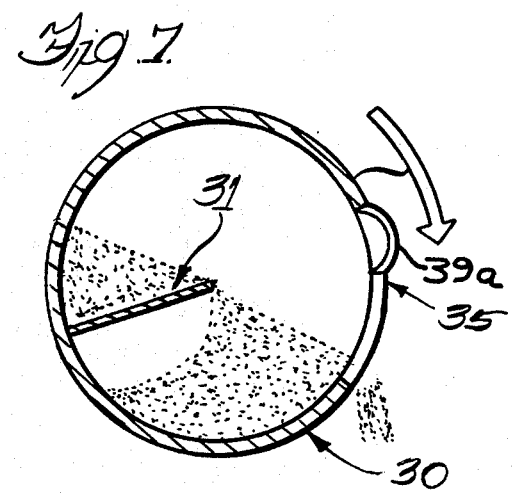
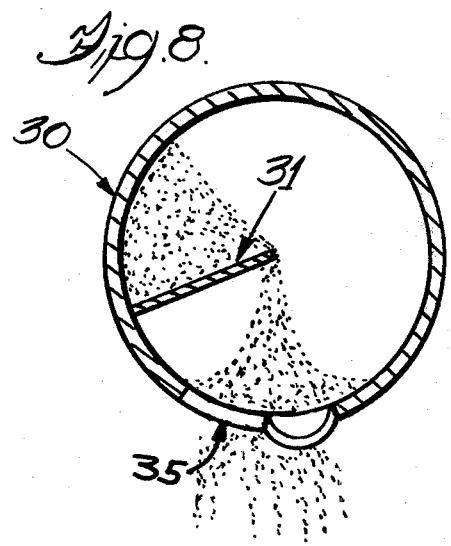

METHOD AND APPARATUS FOR DELIVERING LARGE QUANTITIES OF FEED AND THE LIKE

BACKGROUND OF THE INVENTION

The present invention relates to methods and apparatus for conveying feed, and more particularly describes a high capacity conveyor for poultry feed and the like.

Poultry feeders and associated feed conveying and dispensing apparatus, such as those disclosed in Myers U.S. Pat. No. 3,230,933, Hostetler U.S. Pat. No. 3,388,690 and Myers U.S. Pat. No. 3,511,215, have met with great commercial success. These conveying systems include, in general terms, a hollow conveyor tube containing a centerless auger member which, upon rotation, urges the feed along the tube. The success of these devices has created a marketing demand for a feed conveying system capable of conveying even greater quantities of feed to larger flocks of birds at higher speeds.

When the above and other known feed distribution systems are used in commercial practice, the feed to be distributed to the flock is usually a carefully prepared mixture of several different feed components such as whole kernel grain, mash, pellets, and other ingredients. Some of these feed components consist of relatively large particles, while other components include particles of relatively fine size. Some of the particles are spheroidal in shape, while others are irregular or angular in form. Relatively wide variations in feed mix density, texture and adhering qualities may be found among the various components of a given feed mix, and differing feed mixes are provided with differing component ingredients and differing ingredient proportions. Conveyors for such feed must be able to accommodate such feed characteristics without interruptions or flow stoppages.

Further, conveyors handling these various feed mixes should encourage intermingling or mixing of the various component particles. Such mixing encourages each bird in the feeding flock to consume a properly balanced feed diet. More specifically, while the feed may be relatively completely mixed when it is introduced into the receiving bin, slow movement of the feed down the conveyor tube may result in separation of the feed mix components; i.e., those components consisting of relatively fine particles may tend to collect at one point in the conveyor system, thereby resulting in delivery of large amounts of fine feed particles at one end of the conveyor, and relatively small amounts of fine feed particles at the opposite conveyor end. Experience with this phenomena has shown that when feed is urged along the tube by the auger at relatively low speeds, the feed particles undergo a sliding action relative to one another and to the inner surface of the tube. In accordance with the invention, however, higher feed velocities encourage relatively spheroidal particles to undergo a rolling action. This rolling action not only encourages full mixing of all the feed components, but also reduces the power required to operate the auger.

It has also been found to be desirable to convey and deliver feed to all the feeding stations accessible to the flock in a relatively simultaneous manner. When feed is delivered to stations in seriatim order, the larger and more aggressive birds tend to crowd more timid fowl away from the feeding stations. As a result, the more aggressive fowl are more extensively fed, and they mature quicker and grow larger than the more timid fowl. These unequal growth and maturity rates among the flock members may result in turn, in relatively more difficult flock management.

Simultaneous delivery of feed to all the feeding stations on the conveyor line has also been found to inhibit collection of feed at the conveyor blind end, or that end opposite the end at which the dispensing feed hopper is located. Such feed collection, or packing, tends to jam or break the conveyor auger. This packing occurs especially after the auger and conveyor have been in use for some time, and the inside of the conveyor tube and associated parts have become polished by the abrasive action of the feed particles. The friction between the moving particles and the tube is thereby reduced, allowing the feed to slip easily down the tube and past the dispensing openings into the blind end of the conveyor.

It is therefore an object of the present invention to provide a feed conveyor which will simultaneously deliver relatively large quantities of feed at relatively high speeds to a number of flock feeding stations. A related object is to provide a conveyor which can handle a variety of feed mixes having a variety of physical characteristics at these relatively high speeds and volumes.

It is another object of the present invention to provide a feed conveyor which will promote complete mixing of all the components of the conveyed feed mix, and conversely, which will inhibit separation of the coarse and fine components of the conveyed feed mix as the mix is transported to the feeding stations.

It is still another object of the invention to provide a feed conveying system of the type generally described, which moves relatively large amounts of feed at relatively high velocities with relatively low power requirements by promoting or encouraging a rolling action of the transported or conveyed feed particles.

A further object is to provide a feed conveying and dispensing apparatus wherein feed packing in the conveyor tube is inhibited, and the chance of damage to the system components is thereby lessened.

Other objects and advantages of the invention will become apparent upon reading the following detailed description and upon reference to the drawings. Throughout the drawings, like reference numerals refer to like parts.

FIG. 4 is an elevational view, partially cut away, showing in further detail the conveyor tube, the contained auger, and a typical feed-dispensing outlet;

FIG. 5 is an elevational view showing in yet further detail the feed conveyor tube and the dispensing outlet;

FIG. 6 is a sectional view taken substantially in the plane of line 6—6 in FIG. 5, and showing in further detail the conveyor tube and the associated feed dispensing outlet, the outlet being relocated, for clarification, from the position shown in FIG. 5 to a feed dispensing position located intermediate the blind and hopper ends of the conveyor tube;

Figure 1:
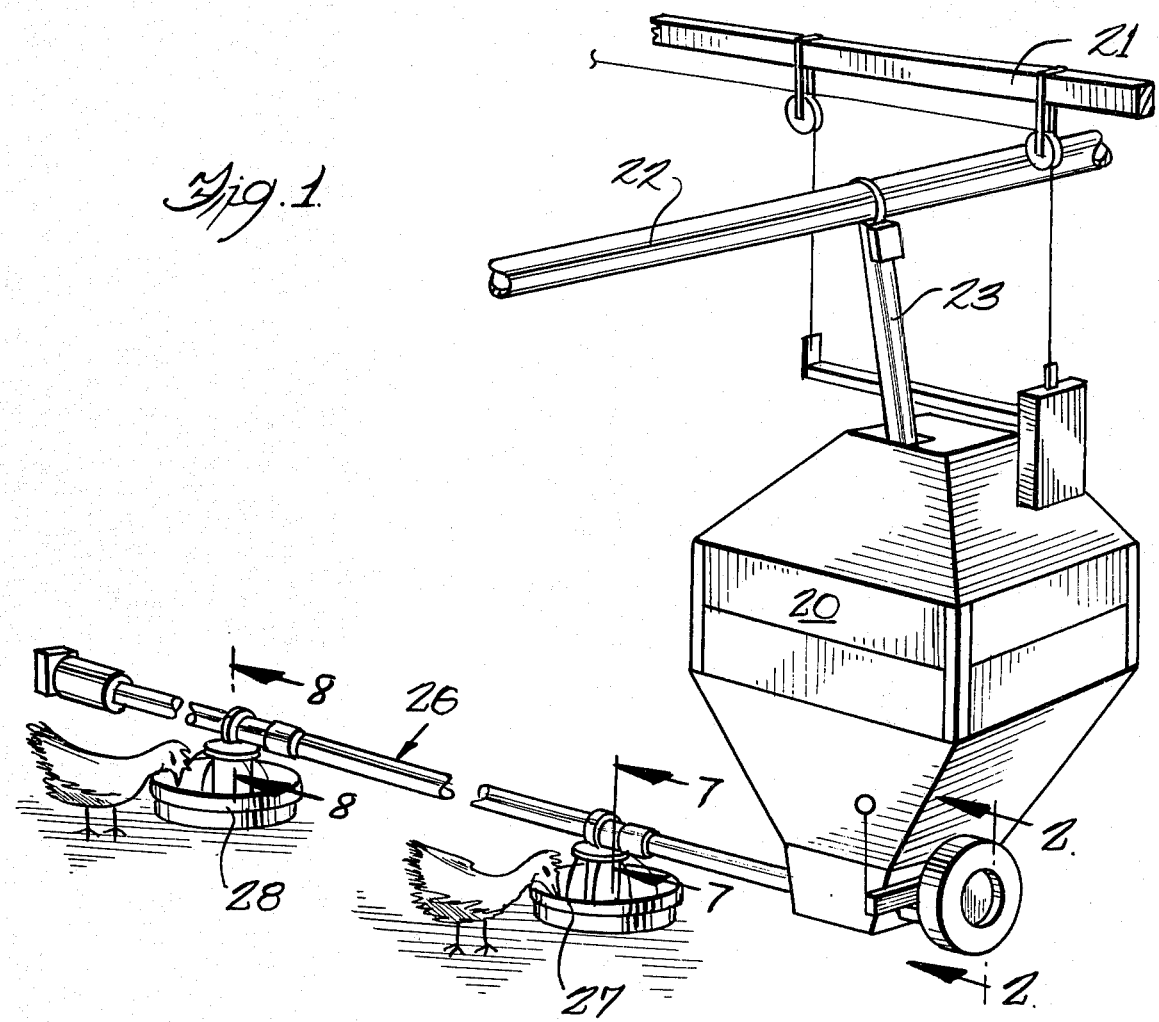
FIG. 1 is a general perspective view showing major components of the feed conveying system.

FIG. 7 is a sectional view taken substantially in the plane of line 7—7 in FIG. 1, and showing in further detail the conveyor tube and the contained auger as they appear in cross-sectional aspect at a feeding station relatively near the feed dispensing hopper; and FIG. 8 is a sectional view similar to FIG. 7, taken substantially in the plane of line 8—8 in FIG. 1, showing in further detail the conveyor tube and the contained auger as they appear in cross-sectional aspect of a feeding station relatively near the conveyor blind end.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention.

Figure 2:
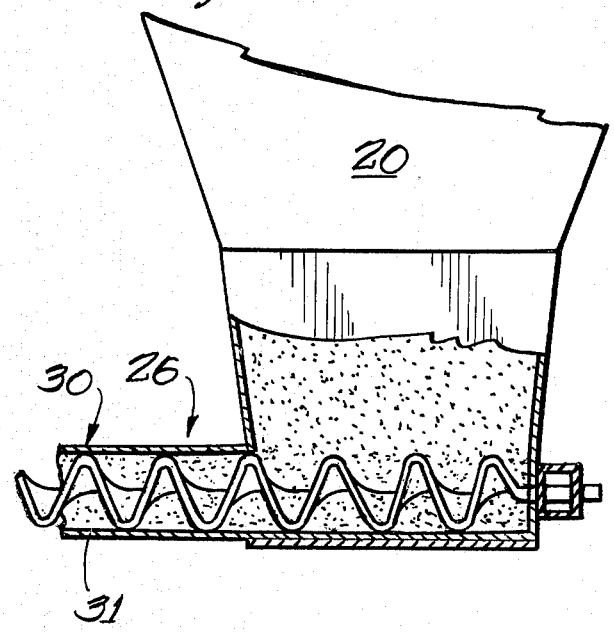
FIG. 2 is a sectional view taken substantially in the plane of line 2—2 in FIG. 1, and showing in further detail the bottom of the feed dispensing hopper and the conveying tube and contained auger.
Figure 3:
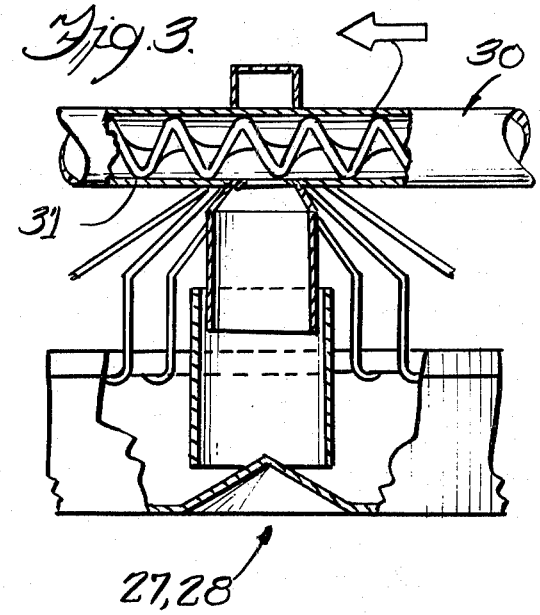
FIG. 3 is a fragmentary elevational view showing in further detail the flock feeding station and the associated conveyor apparatus, the conveyor tube being cut away to show the contained auger.

Turning first to FIG. 1, there is shown a feed dispensing hopper 20 suspended from suitable superstructure 21; the hopper receives a quantity of feed from a bulk dispenser conveyor 22 through a drop tube 23. A novel feed dispensing conveyor 26 constructed in accordance with the invention dispenses feed from the hopper 20 to flock feeding stations 27, 28 which are spaced along the conveyor 26. As is more clearly shown in FIGS. 2—4 and elsewhere, this novel conveyor includes, in general, a tube member 30 within which is carried a centerless auger 31.

In accordance with one aspect of the invention, when feed is moved rapidly down the conveyor tube 30 by the novel auger 31, complete mixing of the particles is encouraged, and a rolling action is imparted to the particles. To this end, the auger member 31 is centerless in configuration, has a relatively extended pitch, and the flights of the auger are substantially radial in extent; that is, each flight extends from the center of the tube to its inner surface, as can be seen in FIGS. 4, 7 and 8. High speed movement of the feed down the tube 30 is further encouraged by relatively rapid rotation of the auger flights. It has been found that rotation of the described novel auger at a speed of substantially 354 rpm and a pitch of substantially 2¼ inches encourages the desired feed particle rolling and mixing action and simultaneous delivery when a conveyor tube of 1½ inches in nominal diameter is used. Inconsequent variations from this auger rotational speed, pitch, and tube diameter will be understood to fall within the scope of this invention wherein a rolling and mixing action is imparted to the feed particles being conveyed.

To obtain equalized distribution of the feed mix components to each feeding station in accordance with the invention, a novel outlet hole 35 is provided in the conveyor tube 30. A full measure of each feed component is included in each slice or bite of feed delivered through this outlet hole 35 to the associated receiving feeding stations 27, 28. To provide this properly proportioned slice of feed for delivery, the outlet hole 35 may be considered to have two general components, including first, an elongated slot 36, and second, a V-shaped notch 37. The elongated slot portion 36 is provided with radially struck end portions 39, 39a to aid in hole formation during tube fabrication. The trailing edge 40 of the V-shaped notch 37 is formed or oriented substantially parallel to the flight 41 of the auger 31. Thus at each rotation of the auger 31, a slice of feed containing a proper proportion of each feed mix component, is pushed out the hole 35 across the edge 40 of the V-shaped notch.

The angular positions of the slots in the tube may be staggered in a helical array of extended pitch in order to encourage simultaneous and uniform feed delivery to all the stations 27, 28. To this end, the outlet 35 associated with a feeding station 27 located relatively near the hopper 20, may be located at a position near the top of the tube, as illustrated in FIG. 7. An outlet 35 associated with the feeding station 28 located at a relatively intermediate point along the conveyor 26 may be located at a relatively intermediate disposition, as illustrated in FIG. 6; and the outlet 35 associated with a feeding station located at or near the blind end of the conveyor may have its outlet slot 35 oriented in a relatively downward position, as illustrated in FIG. 8. Thus oriented, the blind end outlet delivers virtually all the associated feed remaining in the tube to the associated feeding station, thereby preventing feed from packing into the blind end of the conveyor.

The following is claimed as invention:

1. A poultry feeder comprising a high capacity conveyor extending from a source of supply of mixed poultry feed to a plurality of spaced apart feeding stations of simultaneously delivering generally uniform quantities and mixtures of said feed to said plurality of feed stations, said conveyor including an elongated generally horizontally disposed hollow tube having a predetermined internal diameter, said tube having a plurality of spaced outlet holes disposed in a helical array therealong and respectively associated with successive feeding stations, said holes being arranged so that the helical array starts adjacent said source of feed supply and at one side of the tube as viewed from an end of the conveyor remote from said source of supply and finishes generally at the bottom of the tube, all of said holes between the start and the finish of said array being substantially at said one side of the tube and means for imparting to the feed mixture a generally helical rolling and mixing motion extending generally circumferentially in a direction extending from said one tube side toward the bottom around and longitudinally of the tube and thereby substantially simultaneously projecting generally uniform quantities of the feed through all of the outlet holes, said means comprising an extended pitch centerless auger rotatably disposed in said tube and having a diameter substantially the same as said internal diameter, and drive means connected with the auger for rotating the auger at a speed for obtaining said rolling and mixing motion of the feed, said tube having a nominal diameter of about one and one-half inches, said centerless auger having a nominal pitch of about two and one quarter inches, and said drive means having an output driving said auger at about 354 r.p.m.

2. A poultry feeder according to claim 1, wherein said holes respectively have a trailing edge oriented substantially parallel to a flight of the auger member adjacent thereto.

* * * * *